July 28, 1970  YASUYUKI SAKAI  3,521,900

DEVICE FOR REDUCING STEERING FORCE

Filed Feb. 29, 1968  3 Sheets-Sheet 1

INVENTOR
YASUYUKI SAKAI

BY Robillard and Byrne
ATTORNEYS

INVENTOR
YASUYUKI SAKAI
BY Robert... and Byrne
ATTORNEYS

United States Patent Office 3,521,900
Patented July 28, 1970

3,521,900
DEVICE FOR REDUCING STEERING FORCE
Yasuyuki Sakai, Tokyo, Japan, assignor to Nissan Jidosha Kabushiki Kaisha, Yokohama-shi, Kanagawa-ken, Japan, a corporation of Japan
Filed Feb. 29, 1968, Ser. No. 709,255
Int. Cl. B60g 7/00; B62d 7/18
U.S. Cl. 280—94                                       12 Claims

ABSTRACT OF THE DISCLOSURE

A device for reducing the forces necessary to steer a vehicle including a plurality of pins having opposite ends which are pivotally fitted between a control member and a steering member in such a manner that when the vehicle runs in a straight line direction the pins are in a first aligned or "on center" position and assume an "off center" position when the steering mechanism is subjected to a turning force in a manner to reduce these turning forces.

---

The present invention relates to a device for reducing the steering force required to steer an automobile.

There are a number of torque forces which resist steering and which are conducive to restoration of the steering wheel of an automobile to a position wherein the automobile runs in a straight line. Among these forces is first, a self-aligning torque generated by the rotating tires, secondly, a torque which is the product of the side force produced at the ground-contact point of the tire and the caster trail and thirdly, the torque produced by the tendency of the automobile to raise when there exists a king pin angle. A primary objective of the present invention is to produce a torque in a direction opposite to the above-described restoring torques; i.e., in the steering direction, in order to counterbalance a significant portion of the restoring torques and thereby reduce the steering force necessary of application to the steering wheel. This objective is accomplished in steering systems which do not utilize a king pin such as those having a ball joint type suspension system as well as those steering systems in which a king pin is used.

In the ball joint type of steering system, a ball joint couples a steering knuckle to a control arm. The control arm is provided with a stud adapted to rotate with the steering knuckle about the steering axis, a spherical segment fitted into a socket portion of the control arm and held against rotation about the aforesaid axis, and a plurality of elongated pins seated at each end in semi-spherical seats respectively provided in the stud and the spherical segment such that when the automobile runs in a straight line, the projected longitudinal axes of the pins meet at a single point of intersection along the steering axis. The pins are circumferentially disposed about the steering axis and are equidistantly spaced so that when the automobile is being turned, a component force of the load acting along the axis of the pin produces a torque acting upon the moving stud and upon the stationary spherical segment in the steering direction so that the force necessary of application to the steering wheel is reduced. In a steering system employing a king pin, the steering knuckle and the control arm are generally articulated together by means of the aforesaid king pin and thus the load acting in the vertical direction due to the weight of the automobile is supported by the control arm through the steering knuckle. Here also a plurality of pins are utilized in a similar circumferential arrangement about the steering axis. The pins are disposed with one end fitted within spherical seats in a control surface of the control arm and with the other end fitted within spherical seats in an opposed surface in the steering knuckle such that when the knuckle pivots about the steering axis, the pins incline their axes with respect thereto and a torque in the direction of steering is imparted to the knuckle.

An objective of the present invention is to produce a torque between a steering knuckle and a control arm in a direction opposite to the direction of the restoring torques when the automobile is steered and to apply this opposing torque to the steering assembly in the direction steered.

Another object of the present invention is to employ a plurality of pins in the suspension system of a vehicle steering mechanism so that the sliding movement of conventional parts is replaced by a pivoting movement of the pins whereby the friction is reduced while simultaneously reducing the friction opposing steering.

A further object of the present invention is to counterbalance in a most direct manner the restoring torque produced by the wheels by mounting the device of the present invention directly on the steering axle so as to reduce the load exerting upon the steering linkages, steering gear, steering column and other parts of the automobile steering assembly in order to reduce the steering energy loss therein.

A yet further object of the present invention is to provide a device for reducing steering force which can be applied to any vehicle and which can replace a conventional ball suspension joint or king pin thrust bearing without requiring additional installation space.

A still further object of the present invention is to provide a minimum force steering device which will allow a broadening of the range restrictions presently imposed upon the king pin angle and king pin offset particularly in a double wishbone ball joint type suspension and thus free automotive designers in developing other vehicle characteristics without a sacrifice in performance.

Another important objective of the present invention is to provide a device for reducing steering force which replaces expensive conventional power steering systems, but attains similar functional efficiencies, thus reducing vehicle production cost.

Another object of the present invention is to provide a device which can efficiently replace a conventional power steering system yet which requires only a fraction of the space thereof.

Still another object of the present invention is to provide an economical device for reducing steering force which can replace a conventional power steering system so that a portion of the engine power is available for utilization in increasing the overall efficiency of the engine.

A still further objective of the invention is to provide a device which converts a portion of the weight of the vehicle into a steering force when desired.

These and other objects of the invention will become more apparent to those skilled in the art by reference to the following detailed description when viewed in light of the accompanying drawings, wherein.

Figure 2:
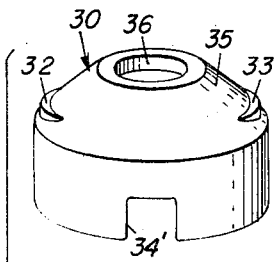
FIG. 2 is a plan view of the upper seat member shown in FIG. 1.
Figure 2:
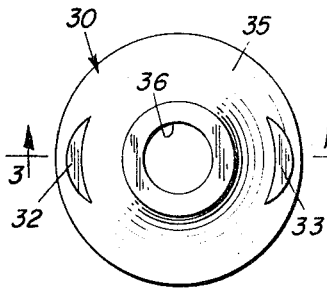
Figure 3:
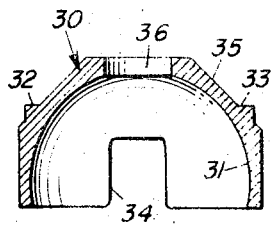
FIG. 3 is a cross-sectional view taken along the line 3—3 in FIG. 2.
Figure 1:
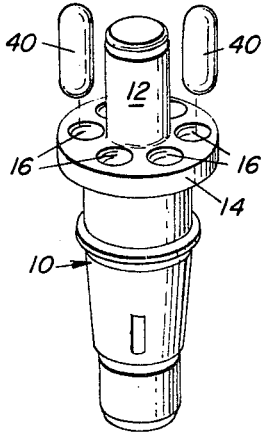
FIG. 1 is an exploded perspective view of a ball joint and associated portions of an automotive suspension and steering system.
Figure 4:
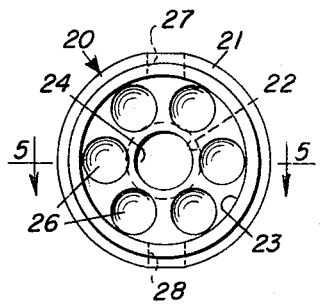
FIG. 4 is a bottom plan view of the spherical segment member shown in FIG. 1.

Referring now to the drawings, wherein like numerals indicate like parts, FIG. 1 shows a suspension ball joint according to the present invention in which a stud thereof is designated by reference numeral 10. The stud 10 includes an upwardly extending neck 12 and a flanged portion 14. The upper surface of the flange 14 is provided with a plurality of spherical seats 16 arranged coaxially and equiangularly of the axis of the stud 10. Each of the spherical seats represents a segment of a spherical surface. The lower surface of the flange 14 is designated by the numeral 18 and is defined by a partial spherical segment.

Figure 5:
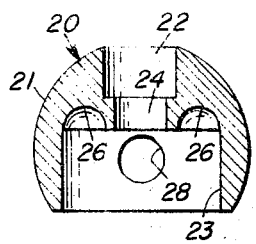
FIG. 5 is a cross-sectional view taken along the line 5—5 in FIG. 4.
Figure 6:
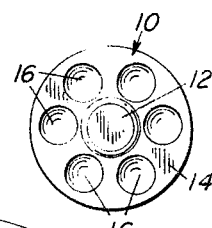
FIG. 6 is a plan view of the stud member shown in FIG. 1.

As best seen in FIG. 5, a spherical segment or cap 20 has an external spherical surface 21. The cap 20 is provided with coaxial bores 22 and 23 of unequal diameter. A stepped portion 24 of the cap 20 is provided with a plurality of spherical seats 26 each of which opposes a corresponding spherical seat 16 in the flange 14. Each of the spherical seats 26 represents a segment of a spherical surface as is the case of the spherical seats 16. Furthermore, the cap 20 has two transverse bores 27 and 28 which are coaxially disposed in such a manner that their axis intersects the common axis of the bores 22 and 23 and passes through the center point for the spherical surface 21.

An upper seat 30 is provided with an inner spherical seating surface 31 for receiving the surface 21. On the upper conical surface 35 of the seat 30, first and second stop lugs 32 and 33 are disposed at opposed shoulder portions and are in the form of cylindrical segments. A pair of opposed openings 34 and 34' are provided in the lower edge of the seat 30 and are displaced 90° from the projections 32 and 33 to communicate with the bores 27 and 28 of cap 20.

A plurality of pins 40 are disposed between the flange 14 and the cap 20 with their opposite ends received in the respective spherical surfaces of flange 14 and cap 20. A spring biasing the cap 20 toward the flange 14 and fitting the neck 12 and the flange 14 of the stud 10 into the bores 22 and 23 respectively so that the stud is prevented by means of a snap ring 42 from being separated from the cap 20 but is held rotatably and vertically movable relative thereto. The pins are elongated cylinders having spherical end portions which fit within the respective seats 16 and 26. The longitudinal axes of the pins 40 fall in planes common to the axis of stud 10 when the vehicle wheels are in their straight-ahead position. This is so in order that there be no turning torque imparted when the automobile is running in its straight line direction.

Figure 8:
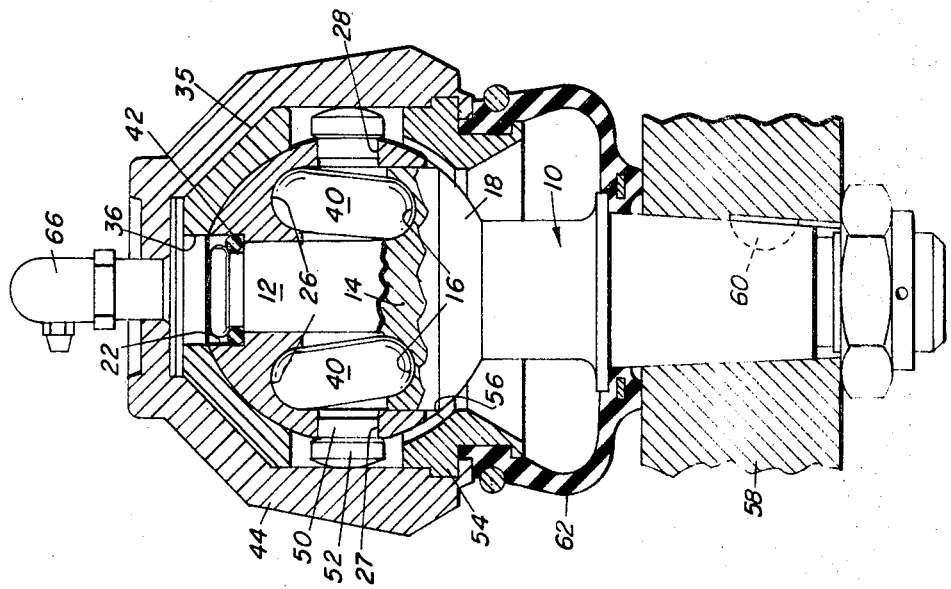
FIG. 8 is a cross-sectional view taken along the line 8—8 in FIG. 7.
Figure 7:
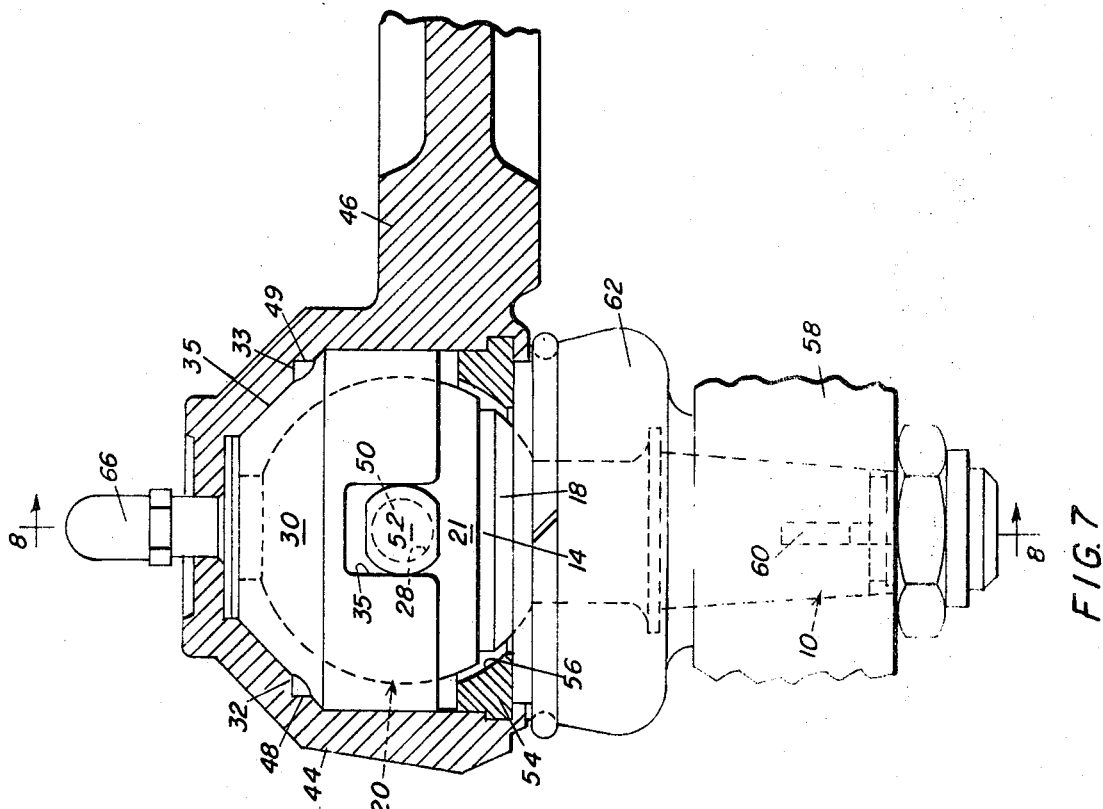
FIG. 7 is a side elevational view partly in section of a first embodiment of the instant invention wherein the elements of FIGS. 1–6 are used.

FIGS. 7 and 8 show the elements assembled. A socket 44 is provided on the extreme end of a control arm 46 and has an inner surface configured to mate with the outer surface of the upper seat 30. The upper seat 30 is located between the socket 44 and the cap 20 in such a manner that the cap 20 can pivot about the center point of the inner spherical surface 31. The socket 44 is provided at its inner peripheral surface with grooves or cavities 48 and 49 in the form of a cylindrical segment for matingly receiving the projections 32 and 33 in the upper seat 30. As a result, the projections 32 and 33 and the cavities 48 and 49 are closely engaged whereby the upper seat 30 cannot rotate with respect to the socket 44.

A key 50 is fitted into each of the bores 27 and 28. Each key 50 has an enlarged head portion 52 respectively located in slots 34 and 34' of upper seat 30. The cap 20 and the key 50 can, therefore, make relative movements about the common axis of the bores 27 and 28 while the key 50 (and thus cap 20) and the upper seat 30 can shift vertically with respect to each other.

A lower seat 54 is securely fixed to the lower end portion of the socket 44 and has an inner spherical seat surface 56 adapted to matingly fit with the spherical surface 21 of the cap 20 and the surface 18 of the flange 14. Seat 54 also maintains the cap 20 in its housing.

As thus described, pivotal movement of the cap 20 about the axis of the bores 27 and 28 is permitted but rotation of the cap 20 about the axis of the stud 10 is prevented. It is to be understood, however, that the stud 10 can rotate about is own axis and also pivot in all the directions about the center point of the spherical cap 20.

A steering knuckle 58 is secured to an end portion of the stud 10 by means of a woodruff key 60. The cap 20, the pins 40 and the stud 10 are arranged in a predetermined direction with respect to the steering knuckle 58. A dust cover 62 is provided between the steering knuckle 58 and the lower seat 54 with the cover 62 secured to the seat 54 by means of a snap ring 4. A grease nipple 66 is provided through the socket 44 for lubrication purposes.

With the construction as described above and when the vehicle runs in a straight line; that is, in a straight forwardly direction, the projected axes of the pins 40 meet at the same point of intersection on the axis of the stud 10. When the steering wheel is turned, the steering torque is transmitted from the steering wheel to the knuckle 58 by linkages not shown to the front wheels so that the front wheels are rotated about the ball joint against the restoring torque. That is to say, the stud 10 is caused to rotate about its longitudinal axis with respect to the spherical cap 20. The cap 20 is, however, prevented from rotating about the said stud axis since it is secured by means of the keys 50 to the socket 44. The spherical cap 20 and its seats 26, upon which the pins 40 are seated, therefore, do not rotate about stud axis. Of course, the seats 16 of the stud 10 within which are seated the lower ends of the pins 40 do rotate with the stud so that the pins 40 are caused to incline with respect to the longitudinal axis of the stud as well as with respect to the stepped portion 24 of the spherical cap 20.

Thus, the pins are moved from their vertical planes assuming an off center or angular position with respect to the axis of stud 10. The weight exerted by member 46 which was absorbed in the pins as a compressive force when the pins were in the plane of stud 10, is converted to a turning force applied in the same direction as the turning force originally applied.

Figure 11:
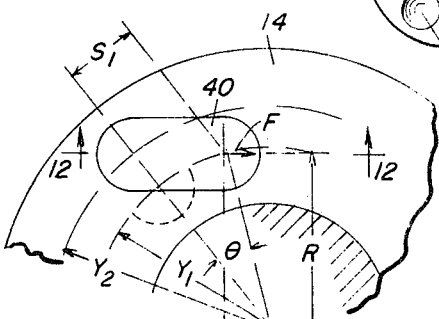
FIG. 11 is a detailed view of a pin and its movement.
Figure 12:
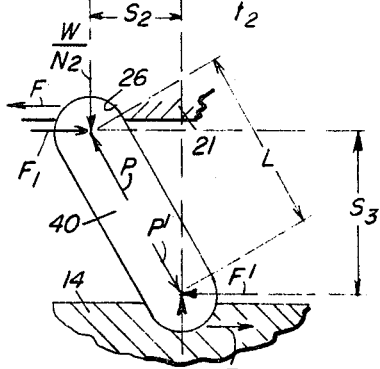
FIG. 12 is a diagrammatic view taken along the line 12—12 in FIG. 11.

The relationship of the forces exerted on each of the pins 40 in the above-described operation is explained with reference to FIGS. 11 and 12. FIG. 11 shows the change of position of the pin 40 when the wheel is turned to the right by $\theta$ degrees while FIG. 12 is a cross-sectional view taken along the line 12—12 of FIG. 11. The dotted line shows the position of the pin 40 when the automobile runs straight forwardly.

The load carried by each pin 40 is represented by the reference W/N, where W is the load exerted on the ball joint while N is the number of pins 40. The pin load W/N results into a force P along the longitudinal axis of the pin and a force F in a direction perpendicular to the load W/N. The force P in the direction of the axis of the pin 40 is counterbalanced by a force P' generated at the other end of the pin in the opposite direction while a component force F along a line parallel to F' is exerted on the spherical seat 16 of the stud 10. The stud 10 is, therefore, imparted with a rotating torque T which acts in the same direction with the steering direction as shown in the diagram.

From FIG. 11, the length $S_1$ of a perpendicular from the lower end of the pin 40 to the plane connecting or including the upper end of the pin 40 and the longitudinal axis of the stud 10, the horizontal distance $S_2$ between the upper and lower ends of the pin 40, the height $S_3$ in the vertical direction between the upper and lower ends of the pin 40 and the distance R between the axis of the stud 10 and the axis of the pin 40 are obtained from the following formulae:

$$S_1 = r_1 \sin \theta$$
$$S_2 = \sqrt{r_1^2 + r_2^2 - 2r_1 r_2 \cos \theta}$$
$$S_3 = \sqrt{L^2 - S_2^2}$$
$$R = \frac{S_1}{S_2} r_2$$

where $\theta$ is the angle of rotation of the stud 10, $r_1$ and $r_2$ the radii of the pitch circles of the upper and lower ends of the pin 40 and L is the length of the pin 40. The counter restoring torque T generated by the pin 40 is obtained from the following equation:

Equation 1 $T = NFR$

The horizontal component force F is:

Equation 2 $F = S_2/S_3 \cdot W/N$

Substituting Equation 2 into Equation 1 results in:

Equation 3

$$T = NFR = \frac{S_2}{S_3} \cdot WR = \frac{S_1}{S_3} \cdot W r_2 = \frac{r_1 r_2 \sin \theta \times W}{\sqrt{L^2 + 2r_1 r_2 \cos \theta - r_1^2 - r_2^2}}$$

Thus, it is readily understood that the torque T is a function of $\theta$ when the values of L, $r_1$, $r_2$ and W are constant and that the torque T increases as $\theta$ increases within a range in which the denominator is rational.

This counter restoring torque acts in addition to the steering torque so that the torque acting upon the tires will be increased. Moreover, according to the present invention reduction of the amount of steering force which must be applied to the steering wheel is made possible and a safer and more positive steering system is provided. A practical example of the advantages derived from the present invention will now be given. Assuming that $$L = r_1 = r_2 = 1 \text{ cm. and } W = 300 \text{ kg.}$$

the counter restoring torque T is derived from Equation 3 thereby:

$$T = \frac{\sin \theta}{\sqrt{2 \cos \theta - 1}} \times 300 \text{(kg.-cm.)}$$

Figure 13:
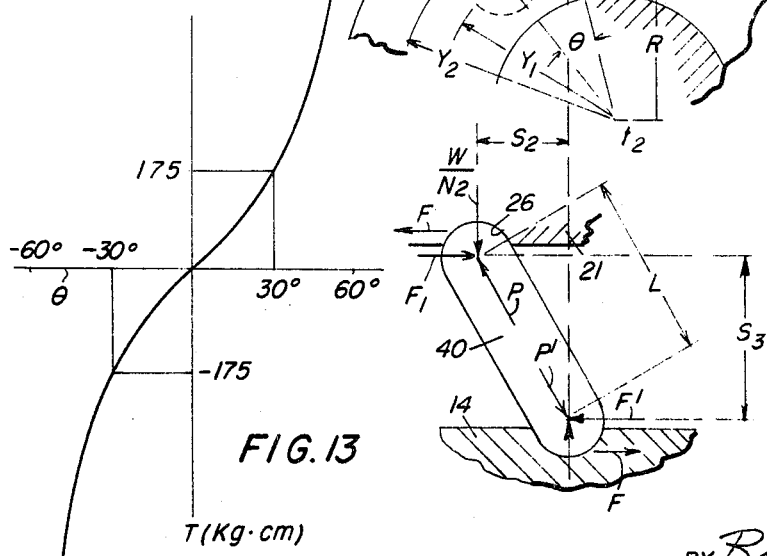
FIG. 13 is a graph showing the relationship between pin movement and counterrestoring torque.

The relation between the counter restoring torque T and $\theta$ is shown in FIG. 13, where the counter restoring torque is plotted along the ordinate while $\theta$, along the abscissa. As is clearly seen from the graph, when the steering angle is 30°, the counter restoring torque is 175 kg.–cm. so that the restoring torque acting on both wheels can be reduced by 350 kg.–cm.

In the present case, it will be assumed that the ratio of the steering wheel angle to angle of rotation of the steered wheel; that is, the overall ratio is 17.5 and the mechanical efficiency of the steering system is 50 percent. The restoring torque acting on the steering wheel will then be reduced by $$350/(17.5 \times 0.5) = 40 \text{ (kg.-cm.)}$$

Therefore, when the radius of the steering wheel is 20 cm., the steering force can be reduced by 2 kg.

Figures 9, 10:
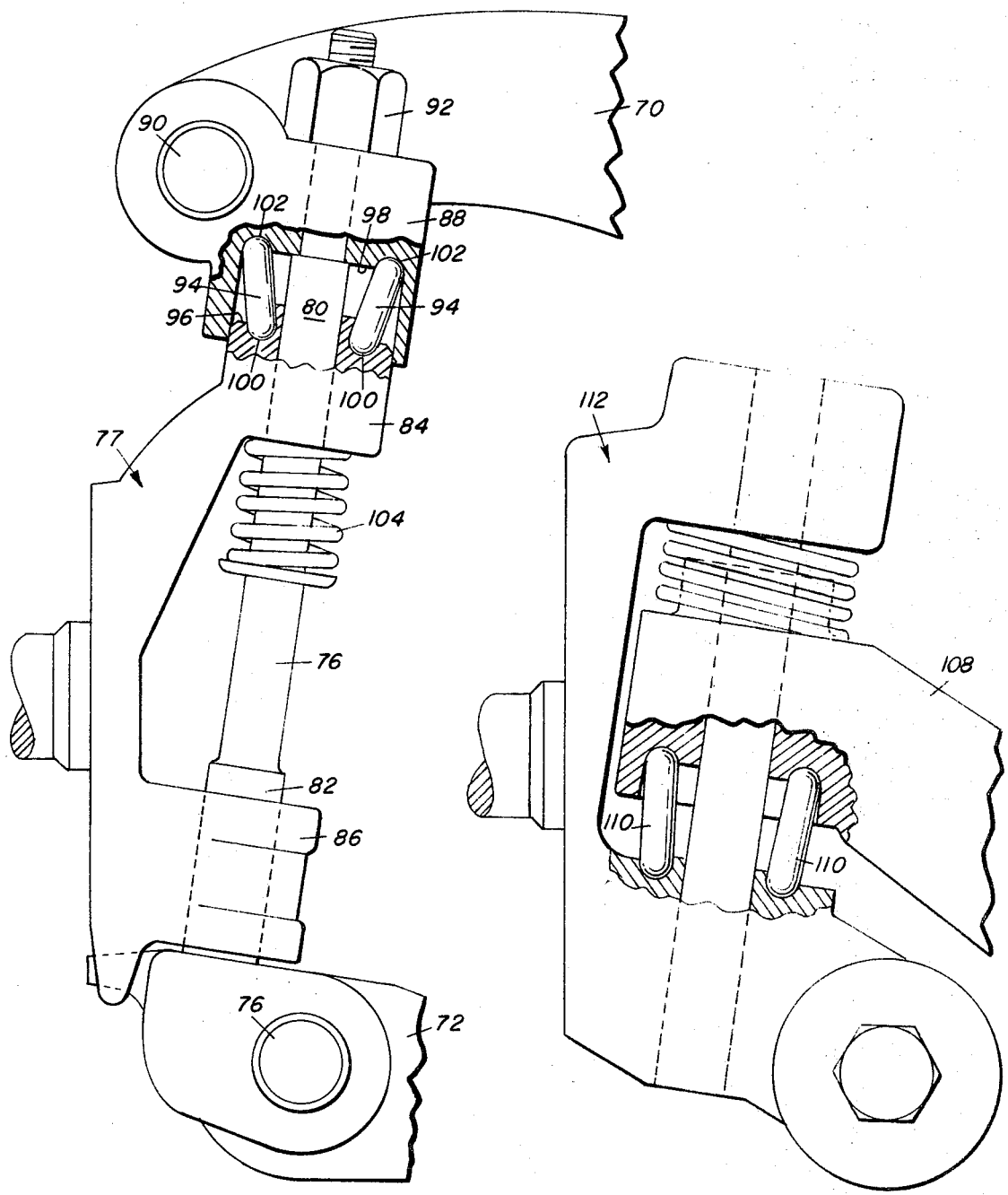
FIG. 9 is a side elevational view partly in section of a second embodiment of the invention.
FIG. 10 is a side elevational view partly in section of a third embodiment of the invention.

Referring now to FIG. 9, a second embodiment of the invention is shown and includes an upper control arm 70, a lower control arm 72, a steering knuckle 74, and a king pin 76. The lower end of the king pin 76 is pivoted to the control arm 72 by means of a pivot 78. Axle portions 80 and 82 of the king pin 76 are fitted into upper and lower journal portions 84 and 86 of the knuckle 74 so that the knuckle is rotatable about the king pin 76. A king pin support 88 which is pivoted by means of a pivot 90 to the upper control arm 70 is fitted over the upper portion of the king pin 40 and is securely joined therewith by means of a nut 92.

A plurality of pins 94 are interposed between the upper steering knuckle portion 84 and the king pin support 88 so as to be arranged peripherally of the axis of the king pin 76. Each of said pins 94 is arranged as in the first embodiment discussed hereinbefore with the longitudinal axes of the pins having a common point of intersection on the steering axis which in this case is the axis of the king pin 76. In order to seat the pins the upper end 84 of the steering knuckle has a surface 96 which is in opposition to a control surface 98 on the lower end surface of the king pin support 88. The surfaces 96 and 98 are respectively provided with a plurality of spherical seats 100 and 102 within which the ends of the pins are received. A spring 104 acts between a flange 106 on the king pin 76 and the knuckle upper end 84 to bias the surfaces 96 and 98 toward one another.

In operation, when the automobile runs straight ahead, the projected axes of the pins 94 meet at the same point of intersection on the king pin axis and, therefore, no rotating torque is imparted to the steering knuckle 74 because of the weight through arm 70 or arm 72. When the steering wheel is turned, however, the steering torque will be transmitted from the steering wheel to the gear, the link mechanism, the steering knuckle and to the front wheels so that the front wheels are turned about the axis of the king pin 76 against the restoring torque. In other words, upon a first steering force initiated by the vehicle operator, steering knuckle 74 is aided in pivoting about the king pin axis. The spherical seats 100 also pivot about the aforesaid axis. On the other hand, the upper seats 102 on the king pin support 88 are not rotated with the result that the pins 94 are caused to incline relative to the king pin axis and to the upper surface 96 of the upper end portion of the knuckle.

The relationship of the forces exerted on and transmitted by each pin 94 is explained in the same manner as shown and described in FIGS. 11 and 12. As is the case of the ball joint described hereinbefore, the length $S_1$ of the perpendicular depending from the lower end of the pin 94 to the plane connecting or including the upper end of the pin and the axis of the king pin; the horizontal distance $S_2$ between the upper and lower ends of the pin 94, the vertical length $S_3$ between the upper and lower ends of the pin 94, and the distance R between the king pin longitudinal axis and the longitudinal axis of the pin 94 are obtained by the hereinbefore described formulae. Once these factors are known, the counter restoring torque T is readily computed by Equation 3 above.

A third embodiment of the present invention is shown in FIG. 10 wherein a front axle 108 is employed in place of a control arm such as was shown in FIG. 9 and a plurality of pins 110 are arranged and disposed between the front axle 108 and a knuckle 112. It can readily be seen that the advantageous effects of this construction are similar to those of the device shown in FIG. 8.

In a general manner, while there has been disclosed effective and efficient embodiments of the invention, it should be well understood that the invention is not limited to such embodiments, as there might be changes made in the arrangement, disposition, and form of the parts without departing from the principle of the present invention as comprehended within the scope of the accompanying claims.

I claim:

1. A steering aid for a vehicle of the type having an operator actuated steering member pivotable about a steering axis, a control arm disposed above said member, a wheel connected to said steering member movable between a straight line position and a turned position, said steering member normally being subjected to a first force tending to maintain said wheel in said straight line position and to a second force which urges said control arm toward said steering member, wherein the improvement comprises:

means between said control arm and said steering member having a first position when said wheel is in a straight-line position wherein said second force is converted to a steering torque in said steering member counteracting said first force and a second position wherein said second force is absorbed.

2. The invention of claim 1 wherein said means comprise a plurality of elongated pins having first and second ends, said pins having their first ends engaged by said control arm and their second ends engaged by said steering member.

3. The invention of claim 2 wherein the longitudinal axis of said pins are in a common plane with said steering axis in said first position when said automobile is traveling in a straight line direction.

4. The invention of claim 2 wherein said control arm includes a control surface and said steering member inclundes an end surface, said control surface and said end surface spaced apart in facing relation so as to be parallel to each other and perpendicular to said steering axis, said control surface and said end surface provided with recesses for pivotally and respectively receiving said first and second ends of said pins.

5. The invention of claim 2 wherein said control arm includes a control surface and said steering knuckle includes an end surface, said control surface and said end surface spaced apart in facing relation so as to be parallel to each other and perpendicular to said steering axis, said control surface and said end surface provided with recesses for pivotally receiving said first and second ends respectively of said pins.

6. A steering mechanism for producing counter-restoring steering torque forces in an automobile comprising a steering knuckle pivotally disposed about a steering axis, a stud secured to said steering knuckle and having a longitudinal axis concentric with said steering axis, a plurality of elongated pins supported at one end by said stud in an arrangement circumferential to said steering axis, control arm means connected to said stud for pivotally receiving the other end of said pins, means for urging said steering knuckle and said control arm means together.

7. The invention of claim 6 wherein said stud has flange means pivotally receiving one end of said pins.

8. The invention of claim 7 wherein said control arm means includes a spherical segment received on said stud such that said stud is rotatably and vertically movable relative to said spherical segment, said spherical segment having a control surface pivotally receiving the other end of said pins.

9. The invention of claim 8 wherein the longitudinal axes of said pins all intersect at a common point on said steering axis when said automobile is traveling in a straight line direction.

10. A steering mechanism for producing counter-restoring steering torque forces comprising a king pin, a steering knuckle receivably disposed about said king pin for pivotal movement about the longitudinal axis thereof, said steering knuckle having an end surface generally perpendicular to said king pin longitudinal axis, a control arm secured to said king pin, said control arm having a control surface generally perpendicular to said king pin longitudinal axis and spaced opposite from said end surface, means for biasing said end surface and said control surface toward each other, said end surface and said control surface each having a plurality of circumferentially disposed spherical seats, and a plurality of pins pivotally disposed between said end surface and said control surface, said pins each having a first end received in the spherical seat in said end surface and a second end received in the spherical seat in said control surface.

11. The invention as described in claim 10 wherein the longitudinal axes of said pins all intersect at a common point on said king pin axis when said automobile is traveling in a straight line direction.

12. The invention as described in claim 10 wherein the longitudinal axes of said pins are all parallel to each other when said automobile is traveling in a straight line direction.

References Cited

UNITED STATES PATENTS

| | | | |
|---|---|---|---|
| 693,962 | 2/1902 | Fox et al. | 280—96.1 |
| 1,449,907 | 3/1923 | Lumley | 280—94 |
| 1,599,442 | 9/1926 | VanHorn | 280—96.1 |
| 1,944,441 | 1/1934 | MacPherson | 280—96.2 |
| 2,971,770 | 2/1961 | Wagner | 280—96.1 |
| 3,007,729 | 11/1961 | Carlson | 287—90 |
| 3,337,232 | 8/1967 | Peickii et al. | 280—95 |

KENNETH H. BETTS, Primary Examiner

U.S. Cl. X.R.

280—90